United States Patent [19]

Ungerleider

[11] Patent Number: 4,485,831

[45] Date of Patent: Dec. 4, 1984

[54] COOKING OIL SALVAGE SYSTEM

[75] Inventor: Hugh J. Ungerleider, Louisville, Ky.

[73] Assignee: D.O.C.E Corporation, Louisville, Ky.

[21] Appl. No.: 496,476

[22] Filed: May 20, 1983

Related U.S. Application Data

[63] Continuation-in-part of Ser. No. 415,329, Sep. 2, 1982, abandoned, which is a continuation of Ser. No. 197,685, Oct. 16, 1980, abandoned.

[51] Int. Cl.³ .................... B67D 5/02; B67D 5/62
[52] U.S. Cl. ...................................... 137/1; 137/341; 137/356; 137/360; 137/377; 137/590; 141/82; 219/311
[58] Field of Search ............... 137/341, 356, 360, 377, 137/429, 558, 590, 1; 219/311, 328; 141/82

[56] References Cited

U.S. PATENT DOCUMENTS

| | | | |
|---|---|---|---|
| 1,797,749 | 3/1931 | Allardice | 219/311 X |
| 2,102,795 | 12/1937 | Gray | 137/234.6 X |
| 2,316,338 | 4/1943 | Kerr | 137/558 X |
| 2,541,095 | 2/1951 | Pilkey | 137/590 |
| 3,206,077 | 9/1965 | Fetterman | 137/341 X |
| 3,280,301 | 10/1966 | Anderson | 219/311 X |
| 3,436,525 | 4/1969 | Stanford | 219/311 X |
| 3,497,673 | 2/1970 | Wright | 219/328 |
| 3,648,477 | 3/1972 | Shartle | 219/311 X |
| 4,188,985 | 2/1980 | Osterman | 137/234.6 X |
| 4,284,173 | 8/1981 | Patterson | 137/234.6 X |
| 4,360,046 | 11/1982 | Streit et al. | 144/82 |

FOREIGN PATENT DOCUMENTS 2810925 10/1978 Fed. Rep. of Germany ...... 219/311

Primary Examiner—Gerald A. Michalsky
Attorney, Agent, or Firm—William R. Price

[57] ABSTRACT

A used cooking oil disposal system for receiving oil from a building includes an oil receiving means inside the building communicating with an external, insulated, cylindrical holding tank having thermostatically controlled heater means servicing at least a part of the tank and a discharge outlet connectable through valve means to a pump for removing the oil from the tank.

13 Claims, 5 Drawing Figures

COOKING OIL SALVAGE SYSTEM

CROSS REFERENCE TO RELATED APPLICATIONS

This is a continuation-in-part of Application Ser. No. 06/415,329, filed Sept. 2, 1982, now abandoned, entitled COOKING OIL SALVAGE SYSTEM, which was a continuation of Application Ser. No. 06/197,685, filed Oct. 16, 1980, and abandoned.

BACKGROUND OF THE INVENTION

The subject invention is in the field of disposal systems and is more specifically directed to a unique system for receiving and storing for subsequent collection, spent or used cooking oil from a restaurant or the like.

The handling of spent cooking oils for disposal purposes in restaurants has normally been effected manually by the draining of such oils into receptacles which are either manually carried or conveyed on dollies or other vehicles to outdoor storage containers. The high temperature of such oils, which can exceed 300° F., presents substantial safety hazards to workers and others in the vicinity who may be accidentally burned. Additionally, the heavy weight of such oil frequently results in other injuries, such as back sprains, and the like.

In addition, spent cooking oil may be sold for reprocessing. However, in order to do so, it is necessary that the oil be collected and maintained in a fashion that allows its ready removal from the premises of the restaurant where the oil has been used. To date, spent cooking oil has normally been stored outside of the restaurant in open drums having removeable lids or at best, in drums stored inside drum cabinets. Because the security provided for these drums is minimal, the oil is often contaminated by waste refuse or various animals. Where drum storage cabinets are used, in most cases, after a few months of use, the cabinets have been seriously damaged during removal of the drums. Normally, when these drums are full of waste storage oil, they are picked up by oil renderer's trucks and transported to the factory for processing. However, the drums are extremely heavy and difficult to handle. In some instances, the drums have been overturned and the contents spilled on the restaurant's parking area in attempting to load them onto the truck.

The cooking oil salvage system of the instant invention provides security for cooking oils. In the past waste cooking oil has been extremely valuable and has often been stolen. The tank of the instant invention substantially reduces or eliminates this problem. Secondly, by storing cooking oil outside of the restaurant in a closed, controlled access container, internal and external restaurant housekeeping and sanitation problems normally associated with waste cooking oil are eliminated. For example, previous external storage containers often leaked onto black top surfaces, causing severe degradation. In the past, health department rules often made difficult the storage of waste cooking oil within the restaurant facility. Moreover, by storing the oil in a closed and sealed container, rodents, insects and solid contaminents are eliminated and potential external and internal sewer clogging from waste oil discharge is eliminated. Additionally, the cooking oil salvage system of the instant invention provides a cost saving means for the restaurant operator by increasing the amount of usable internal restaurant space and by providing an additional source of money from an upgraded sale of the salvaged cooking oil. Because this system provides an exact accounting of all cooking oil supplies, it substantially reduces pilferage by store employees. Finally, because virtually all possibility of oil contamination during storage is eliminated, the oil itself may be reused for as additives for soaps, cosmetics, animal foods, plastics, etc.

Therefore, it is an object of this invention to provide a new and improved means for handling and disposing of spent or used cooking oils.

It is another object of this invention to provide a method for readily storing for sale spent cooking oil, so that it may be removed from the restaurant in a convenient, easy to handle fashion.

These and other objectives are obtained by utilizing the system of the instant invention.

SUMMARY OF INVENTION

Achievement of the foregoing objects is enabled by the preferred embodiments of the invention through the provision of a receiver means mounted inside the building from which the spent or used cooking oils are to be removed. The receiver means is connected to a transfer conduit extending through one of the walls of the building and having an outer termination external of the building comprising a connection to an insulated holding tank permanently mounted outside the building. The holding tank may be cylindrical construction and is provided with an electrically powered heater means to maintain the temperature of oil in the holding tank at a desired temperature above the solidification temperature of the particular cooking oil. Used cooking oil is discharged from the holding tank by means of a discharge tube inserted into the tank. Used oil which is maintained at pumping viscosity by the heater is periodically collected by connecting a hose to the discharge tube and pumping the liquid into a collection vehicle such as a tank truck.

A better understanding of the manner in which the preferred embodiments achieve the objects of the invention will be enabled when the following detailed description is considered in conjunction with the appended drawings in which like reference numerals are used for the same parts as shown in the different figures.

DESCRIPTION OF THE PREFERRED EMBODIMENT

Figure 1:
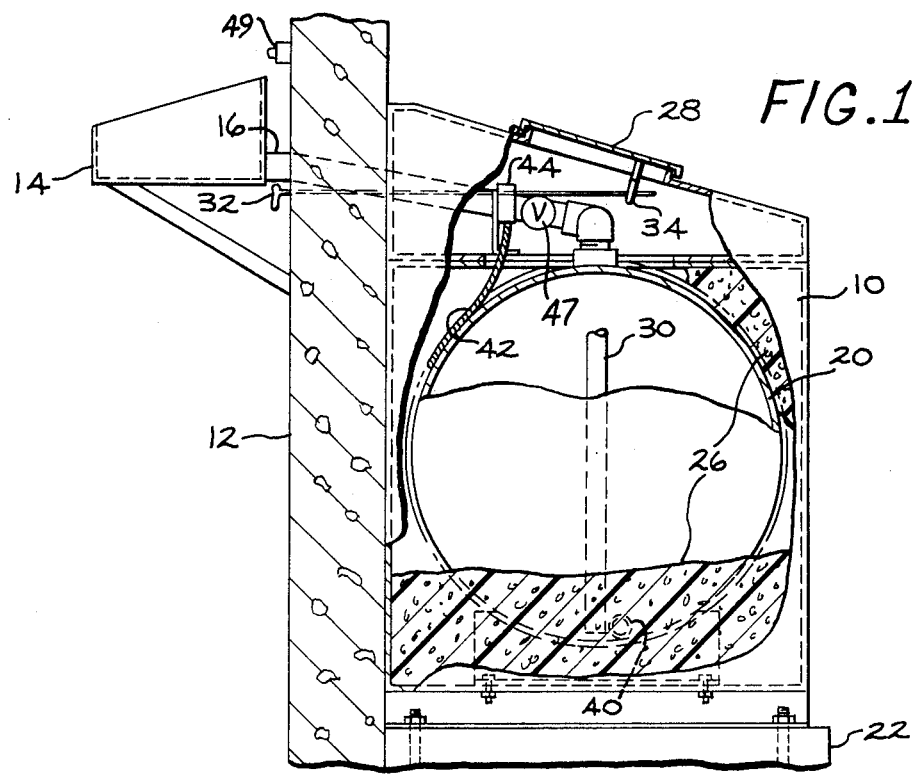
FIG. 1 is a sectional view of the invention.

FIG. 1 of the drawings illustrates the preferred embodiment of the inventive cooking oil salvage system, generally designated 10, which is shown in conjunction with a building wall 12 which will normally be an external wall of a restaurant or the like. The system may include a receiver sink 14, preferably formed of stainless steel, and including a removable filter screen not shown. In an alternative arrangement, a simple drain pipe 16 or receiver means may replace the receiver sink, in which case a regular dolly oil filter may be employed to pump filtered oil from deep fryers in the restaurant directly into the pipe and thus, into the cooking oil salvage system.

Figure 3:
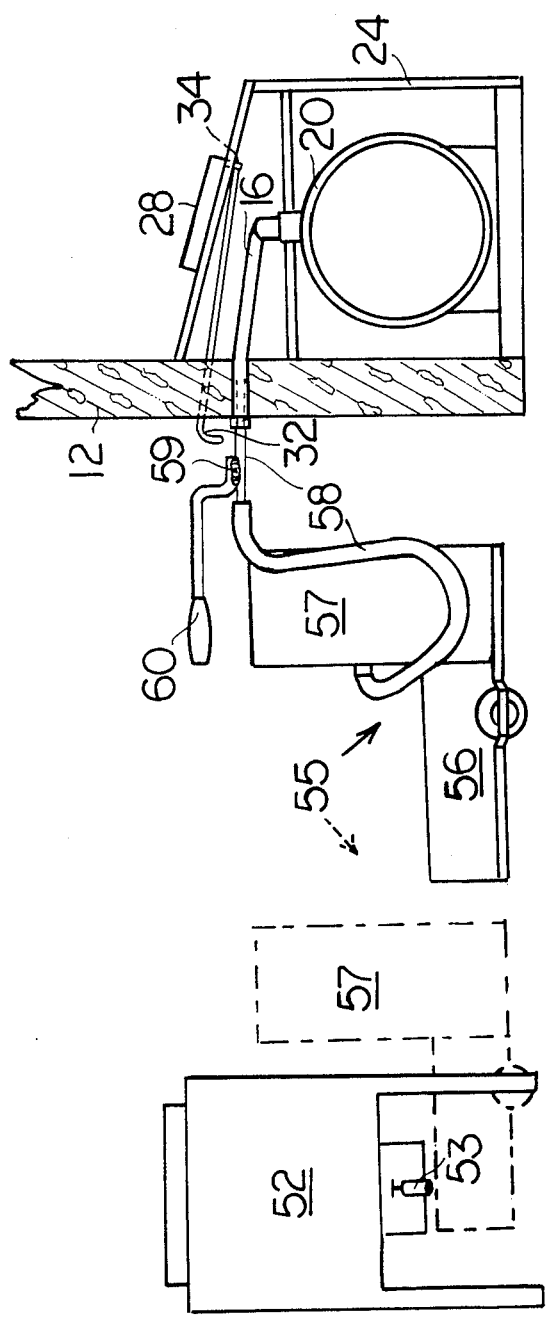
FIG. 3 is a diagrammatic side elevation with parts in phantom of a deep fat pressure fryer and a Collectramatic ® filter floor dolly illustrating one method of draining the oil from the cooker and pumping it into the holding tank.

This method is illustrated in FIG. 3 in which a floor dolly 55 is positioned with its basin 56 directly below the drain valve 53 of the pressure fryer 52. The hot oil drained therefrom can be pumped through the filtering system located in the vertical portion 57 of the floor dolly 55 and pumped via wand or probe 58 back into the cooker 52. The wand or probe has an insulated handle 60 welded at point 59 to the wand so as to be offset therefrom and prevent scalds or burns to the party handling the wand.

After the oil has been used for a sufficient time to become rancid or, after the fatty acid concentration has reached or surpassed an acceptable limit, the oil is discarded again by draining the oil from the fryer 52 through the drain valve 53 into the basin 56 of the floor dolly 55. The floor dolly 55 is then pushed toward the building wall 12 and the end of the wand 58 is inserted into the horizontally disposed conduit 16 extending through the vertically disposed wall so as to pump the hot and filtered used oil into the holding tank 20. Since the holding tank 20 is located within the tank housing 24 which is filled with insulation 26, the heat of the oil is not rapidly lost. However, in cold weather the heating element 42 controlled by the thermostatic control 44 can maintain the oil at any desired temperature.

Figure 4:
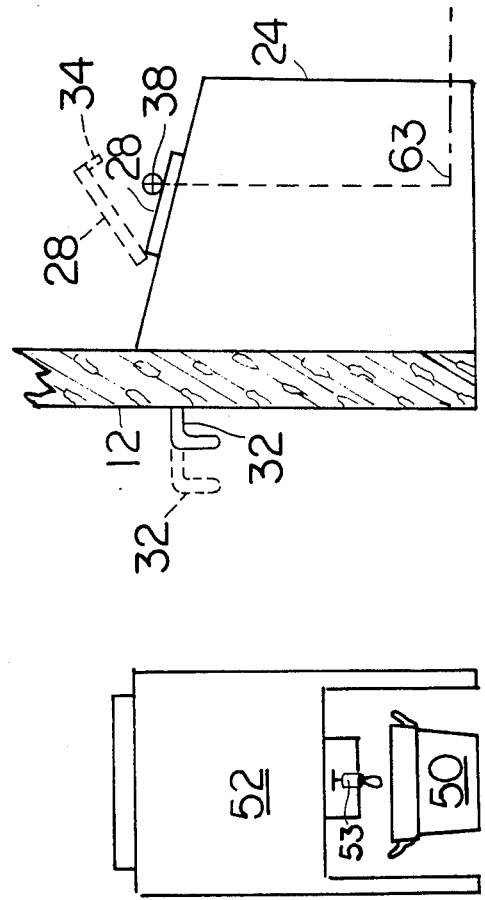
FIG. 4 is a side elevation of the prior art method of emptying the contents of the pressure cooker or fryer into a stock pot.

FIG. 4 illustrates the prior art method of draining the pressure fryer or cooker through drain valve 53 into stock pot 50. In this embodiment, the stock pot can be manually picked up and carried to the building wall 12 and poured into the receiver sink 14. Thus the hot oil will run through conduit or pipe 16 to the holding tank 20 inside of the tank housing directly adjacent to the exterior building wall 12 as previously indicated.

Figure 5:
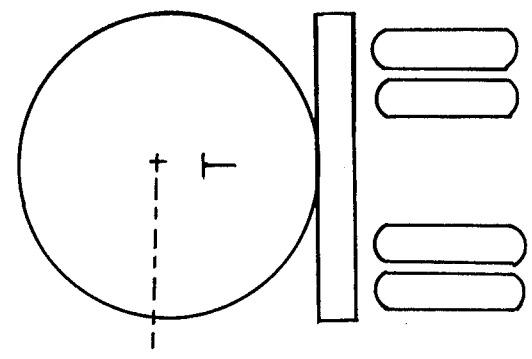
FIG. 5 is a side elevation, diagrammatically illustrating the method of pumping oil from the holding tank into the tank truck.

As is illustrated in FIG. 5, the holding tank can be emptied easily and quickly by connecting a hose to disconnect coupling 38. A pump P and meter are diagrammatically illustrated in the hose 63 leading to tank truck T.

Since the oil is filtered and can be maintained clean and free of contaminents the oil collector or renderer can determine exactly how much high grade oil has been pumped into his truck. The restaurant operator gets top dollar for his waste oil and the safety and housekeeping problems encountered with open drum storage are eliminated.

The system will normally be positioned in the building in an area convenient to the deep fat cooking area so as to be conveniently located for receiving the spent or used cooking oil. The spent or used cooking oil can be deposited in the sink 14 by pump and conduit means, or from manually positioned containers or stock pots 50, or preferably by pumping the oil directly from the deep fryers via the word or probe of a dolly oil filter and pump of conventional design through conduit 16 horizontally disposed in the vertical exterior wall 12 to the holding tank 20 disposed in the insulating housing 24 directly adjacent to the building. Dolly filters or floor filters are commercially available from Collectramatic, Inc. of Louisville, Ky., Mies Filter Products of West Bend, Wisc., and Dean Industries of Culver City, Calif. The hot oil is drawn from the cooker, filtered free of all particulate matter, and pumped via a tube and nozzle (known in the trade as a wand) of the dolly filter back to the cooker. Whenever the free fatty acid of the oil reaches or exceeds 1.5%, the oil must be discarded, since a rancid taste is then imparted to the food. It is at this time that the operator drains the cooker of the hot rancid oil into the dolly filter, and then rolls the dolly filter to the wall adjacent to pipe 16. He then pumps the oil, filtered free from all particulates, through the wand into the pipe 16 for storage in the tank 20. In some fast food establishments, dolly filters are not used. In these establishments, the hot oil is drained through a large funnel-shaped filter into a five gallon stock pot with handles on either side. The employees then must pour the polished or filtered oil back into the cooker. Prior to this invention, if the oil had become rancid, it became necessary for him to carry the hot oil, holding it at arms length away from his body, to the drum storage area where it was to be stored. This was usually at the rear of the parking lot. According to this invention, the distance to which the hot oil had to be carried was much reduced. It was now only from the cooker to the sink 14 on the inner surface of the wall—rather than from the cooker to clear across the parking lot. Since most fast food restaurants employ teen-age workers at minimum wage, and, since it is necessary to hold the hot stock pot of oil away from his body for some distance, prior to this invention it was not uncommon for some of the hot grease to splash over the side and spill onto the worker causing serious second and even third degree burns. This was particularly true in a busy restaurant where the worker had, in effect, to open up the door with his foot or with his back holding the four or five gallons of 300° F. oil at full arms length away from his body and make the trip to the drum storage area. A misstep, or a slip, could and did cause young employees serious and painful injuries.

According to a preferred embodiment of this invention, spent cooking oil is pumped via the wand of the filter dolly into pipe 16 and flows outwardly through the pipe or transfer conduit 16 extending through the wall 12 and into the interior of a cylindrical holding tank 20 permanently mounted on foundation 22. The holding tank is mounted on its cylindrical side, preferably parallel to the sides of the building. The tank is placed inside a tank housing 24 which is provided with insulation 26 preferably surrounding the tank 20 itself. In addition, it is preferred that the transfer conduit 16 coming through the building wall not be exposed to exterior elements, but rather that the tank housing be mounted flush against the wall area where the transfer conduit penetrates the wall, so that any oil flows directly from the inside of the building through the wall 12 to the inside of the tank housing.

The transfer conduit 16 extends through the top of the holding tank 20 to permit direct discharge of used cooking oil directly into the interior of the tank. For easy access to the tank itself and to the discharge tube 30, a service door 28 may be provided, for example, on the top of the housing. Side service doors may also be included to facilitate cleaning and maintenance. In a preferred embodiment, a service door latch means 32 is located inside the building. The latch is engagable in a latch receiver 34 on the service door. Since the latch is operable only from the inside of the building, access to the cooking oil salvage system is not permitted except with permission of the store occupants. As a result, further protection against cooking oil pilferage or damage to the salvage system is provided.

Figure 2:
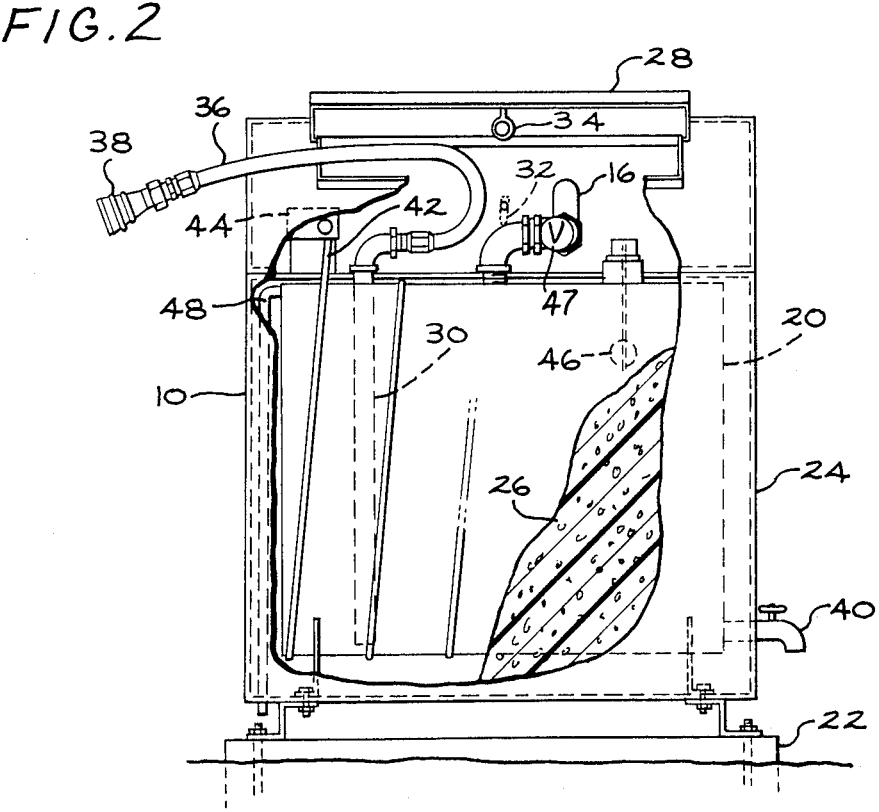
FIG. 2 is a partially cut away from view of the invention.

A discharge tube 30 is shown in FIG. 2, which includes a valve to be opened to permit the pumping of the contents of the tank to a collection vehicle. The discharge tube extends nearly to the bottom of the holding tank, so that virtually all of the used cooking oil may be pumped from the tank into the collection vehicle. Connected to the end of the discharge tube is a flexible hose 36 provided with a quick disconnect coupling 38, coupling onto a corresponding receiver hose on the collection vehicle. For drainage and cleaning a gravity discharge petcock 40 is provided at the bottom end of the tank, to allow complete drainage of the tank when cleaning is necessary. The tank is also provided with a heating element 42, wrapped around at least a portion and preferably all of the tank. It is preferable to maintain the contents of the tank at flowable viscosities, usually at temperatures in the range of about 105° to 110° F. Normally with a 110 gallon tank a 350 watt heating cable is sufficient, while with a 220 gallon tank a 700 watt heating cable is required. The heating cable is provided with a thermostat control means 44 to maintain the temperature of the cooking oil at the desired temperature. In order to insure that the tank is not over filled, an automatic shut off valve 47 or warning indicator electrically connected to a light 49 inside the restaurant is provided. Regardless of which embodiment is chosen, a fluid level measurement means 46 is provided. This measurement means either activates a light 49 or closes a valve 47 located preferably on the transfer conduit 16 when the cooking oil reaches a predetermined height in the tank. In addition, in order to protect the inside of the tank housing from excess cooking oil, an overflow pipe 48 is provided to discharge excess oil.

In use, the cooking oil salvage system of the instant invention is gradually filled with used cooking oil. At periodic intervals, the contents of the tank are pumped from the tank into a bulk cooking oil salvage vehicle, such as a tank truck, and sold. In this manner, a safe and cost effective storage recovery of used cooking oil is provided. By using this system, restaurants may make hundreds of dollars a year in the form of sales of used cooking oil, while at the same time, restaurant employees are protected from dangerous hot cooking oil.

What is claimed is:

1. A cooking oil salvage and disposal system, including means for receiving and transferring hot, used cooking oil from a food processing building through a vertical exterior wall of said building to a receiving tank mounted externally of said building which comprises:
   A. a conduit extending horizontally through said exterior vertical wall and opening on the inner surface of said exterior vertical wall on the inside of said building;
   B. a receiving tank on the exterior of said building, in communication with said conduit, for receiving hot, used cooking oil from said building;
   C. an insulated tank storage compartment adjacent said exterior wall which contains said receiving tank;
   D. a means for heating the contents of the tank to bring the contents of said tank to the proper viscosity for pumping;
   E. an oil discharge tube for connection to a pump for removing the oil from the tank;
   F. a normally-latched service door on said compartment, to provide access to said oil discharge tube; and
   G. latch means operative from the interior of said building for opening said service door.

2. The system of claim 1, wherein the oil discharge tube extends to the bottom of the tank and is provided with a flexible hose.

3. The system of claim 2, wherein the flexible hose is further provided with a quick disconnect coupling corresponding to a receiver hose coupling on a collection vehicle for the oil.

4. The system of claim 1, wherein a fluid level measurement means within the tank is provided.

5. The system of claim 4, wherein the fluid level measurement means activates a warning light inside the building when the fluid within the tank reaches a predetermined level.

6. The system of claim 4, wherein the fluid level measurement means within the tank closes a valve on the receiver means when the cooking oil reaches a predetermined height in the tank.

7. The system of claim 1, wherein an oil overflow tube is provided to discharge excess oil from the tank.

8. The process for the safe and sanitary transfer of spent, hot cooking oil, used in a commercial cooker of a food processing building to a storage tank located outside said building, inside a locked, insulated housing and connected to a conduit extending through the exterior wall of said building and opening inside on the inner surface of said wall inside said building, which comprises the steps of:
   A. removing the spent, hot cooking oil from said cooker;
   B. filtering said oil and removing all filterable particles therefrom;
   C. transferring said filtered oil through said conduit from within said building to the storage tank outside said building;
   D. applying the heat necessary to the contents of said tank to bring the spent oil to a pumpable viscosity;
   E. unlatching a service door of said locked insulated housing by manipulation of a latch means inside of said building;
   F. coupling an oil discharge tube from said tank through an opening opened by said service door to a receiver hose, leading to a pump; and
   G. pumping the spent oil from said tank for transport to an oil receiving receptacle.

9. The process, as defined in claim 8, in which the conduit opening into the inner surface of said building is connected to a sink; and in which the steps of removing the spent hot cooking oil from said cooker involves:
   A. draining the oil into a stockpot;
   B. manually carrying the oil to said sink; and
   C. pouring said oil into said sink for transfer through said conduit to the storage tank outside said building.

10. The process, as defined in claim 8, in which the spent hot cooking oil is pumped from the cooker through a filtering apparatus and into a filter dolly having a wand and thereafter rolling the filter dolly to the exterior wall adjacent the conduit opening and filtered oil is pumped via the wand of the filter dolly into said conduit for transfer into said storage tank.

11. The process, as defined in claim 8, in which the spent hot cooking oil is drained into a filter dolly and thereafter rolling the filter dolly to the exterior wall adjacent said conduit and pumped into the conduit for transfer to the storage tank.

12. The process, as defined in claim 8, in which the oil from said storage tank is pumped and metered into a tank truck.

13. The process, as defined in claim 8, in which the contents of the tank are thermostatically maintained at a constant temperature during the storage period.

* * * * *